Aug. 8, 1944.                    B. D. WILLIS                    2,355,352
                               INDICATING SYSTEM
                            Filed April 30, 1942            3 Sheets-Sheet 2

INVENTOR.
                                    BERNARD D. WILLIS,  DECEASED
                                BY   WM. WALTER OWEN,   EXECUTOR
                              BY  Davis, Lindsay, Smith + Shute
                                                         ATTORNEYS

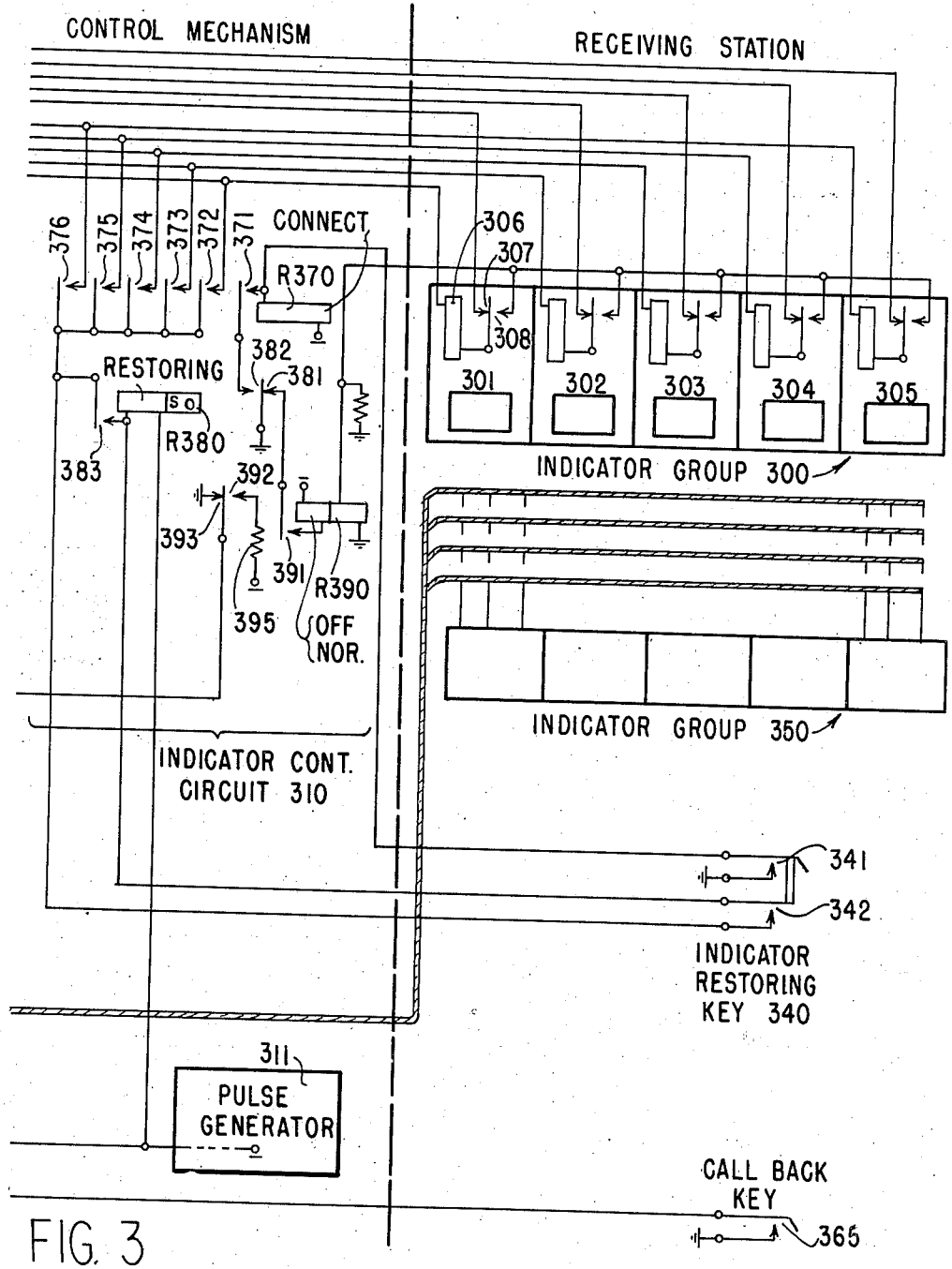

Patented Aug. 8, 1944

2,355,352

UNITED STATES PATENT OFFICE 2,355,352

INDICATING SYSTEM

Bernard D. Willis, deceased, late of Oak Park, Ill., by Wm. Walter Owen, executor, Elgin, Ill., assignor to Automatic Electric Laboratories, Inc., a corporation of Delaware Application April 30, 1942, Serial No. 441,113

3 Claims. (Cl. 177—353)

The present invention relates to indicating systems and, more particularly, to improvements in systems for transmitting information received at one point to a remote point for visual display thereat.

It is an object of the present invention to provide a system of the character described which is simple in arrangement, includes facilities for posting several different items of information, utilizes a minimum of equipment, and is positive and reliable in operation.

It is another object of the invention to provide in a system of the character described, a single automatically controlled switch which may be of any desired type and is controlled to operate as a digit sequence switch for directing the impulses of successive digits to different indicators and also to select an idle group of indicators from a plurality of groups of indicators associated therewith.

The improved indicating system, as described with particularity below, is of particular utility in transmitting to the flight observation point of an airplane dispatching or observing organization. A large map may be provided at this point for indicating the location of planes flying within a given area. Observers variously located throughout this area may, by using telephone or other communication facilities, transmit to a central operator descriptions of planes observed within the area and the directions of flight of the observed planes. The operator, upon receiving this information, may utilize the improved system as herein disclosed to transmit the received information to the flight observation point.

Figure 1:
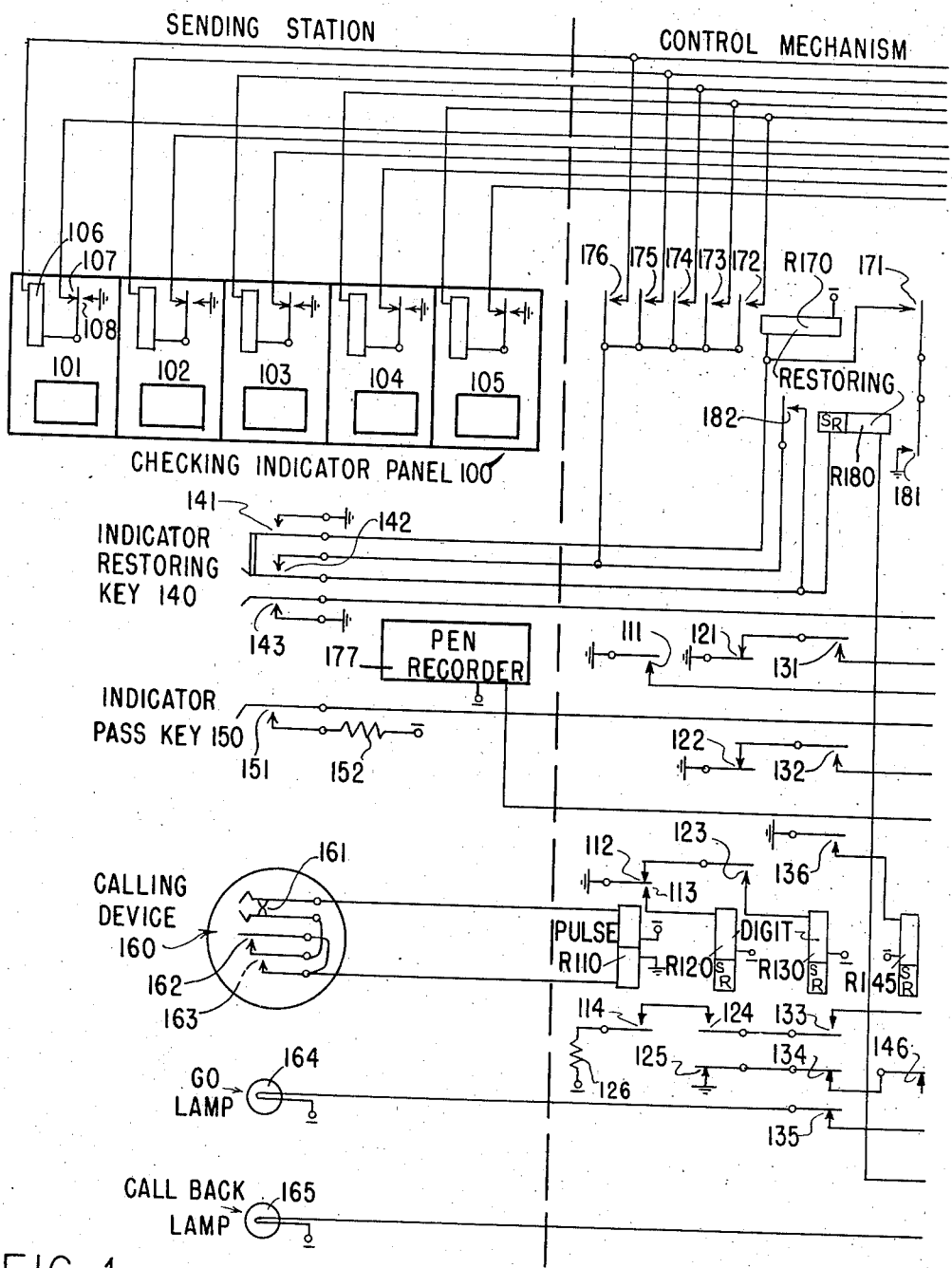
Figure 2:
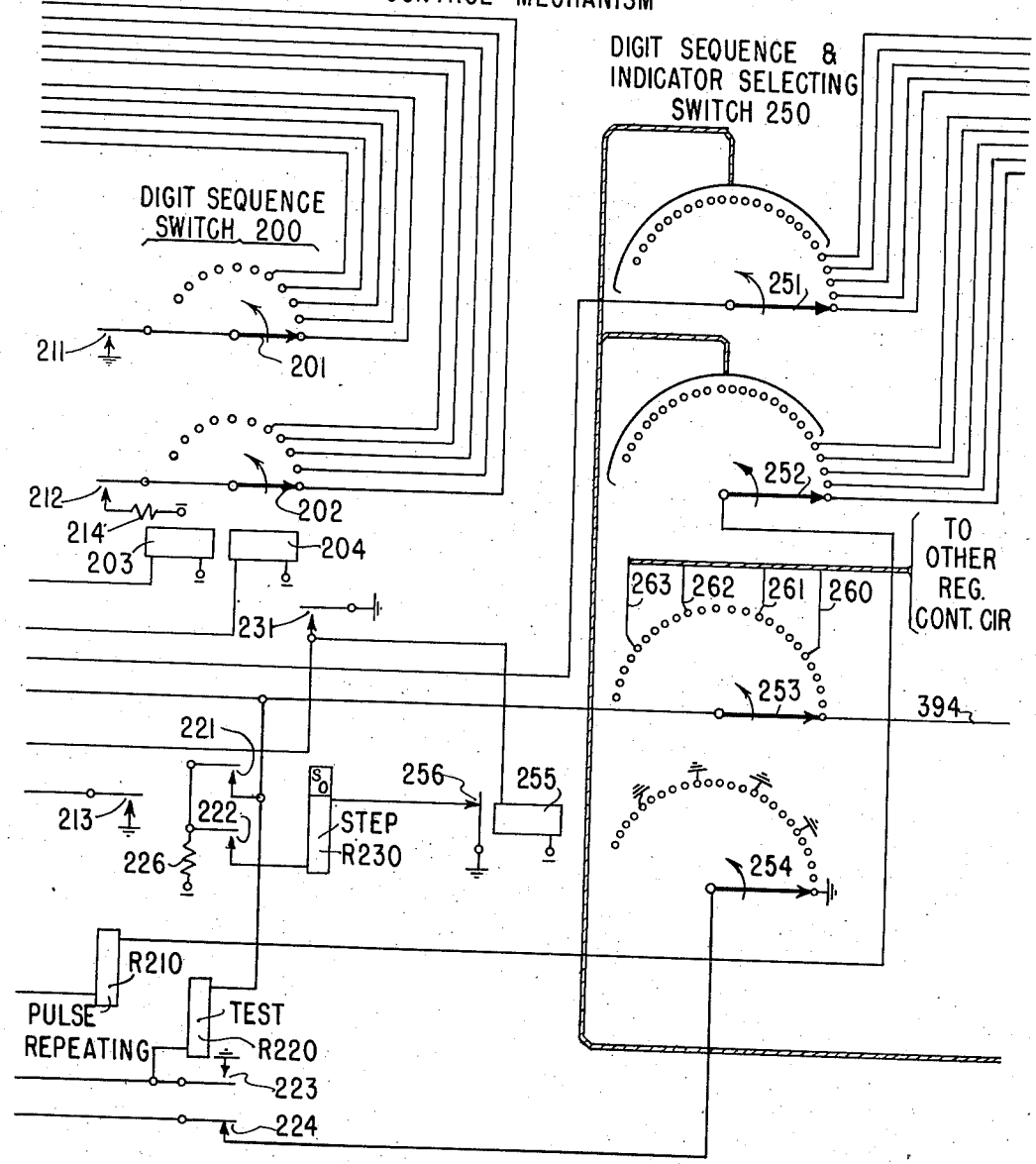

The invention, both as to its organization and method of operation, together with further objects and advantages thereof, will best be understood by reference to the specification taken in connection with the accompanying drawings in which Figs. 1, 2 and 3, when placed side by side in the order named, illustrate a system characterized by the features of the present invention.

Referring now more particularly to the drawings, the system there illustrated comprises a display board which is provided with a plurality of groups of indicators 300, 350, etc. This display board is provided at a receiving station or observation point in the view of an attendant who, upon receiving the information set up in any group of indicators, may record the received information upon a map or chart, and then release the particular indicator group displaying the information. Five indicators are provided in each of the several indicator groups. For example, the indicator group 300 comprises the five indicators 301, 302, 303, 304 and 305 which may respectively be operated by the received impulses of the ten thousands, thousands, hundreds, tens and units digits of a five digit code number utilized to set these indicators so that they display a desired indication. Each of these indicators is of the well-known electro-mechanical type and is provided with a display board drum which may be rotated from a normal or blank position to any one of ten off-normal positions wherein the numerals "1" to "9" and "0" are respectively displayed thereby. The indicating drum of each indicator is mounted on a drive shaft to which rotary movement is imparted in one direction only by a pulse-controlled operating magnet and an associated ratchet and pawl or Geneva gear mechanism. The drive shaft of each register also carries a cam which is arranged to control an associated set of commutating contacts in the manner more fully explained hereinafter. If desired, the various indicators may be of the construction disclosed in Fig. 22 of Patent No. 2,234,684, granted March 11, 1941, Martin L. Nelson and Harold C. Robinson.

Each group of indicators has associated therewith an indicator control circuit which is utilized primarily to effect the release of the indicators in the associated group. For example, the indicator group 300 has associated therewith a control circuit 310 which is illustrated as comprising a connect relay R370, a start restoring relay R380, and an off-normal relay R390. These three relays are arranged to be controlled by an indicator restoring key 340 which is also individual to the indicator group 300 and is provided at the receiving station. It will be understood that similar control circuits and restoring keys individual to the other indicator groups provided at the receiving station are also included in the system. A "call back" key 365 is also provided at the receiving station for enabling the attendant at this station to signal the operator at the distant sending station that verification of a received item of information is required.

The selective control of the indicators in the various groups is effected from a remote point at which the information to be posted on the display board is received. This remote point is illustrated as comprising a sending station at which is provided the equipment shown to the left of the vertical dash-line appearing in Fig. 1 of the drawings. This equipment includes a checking indicator panel 100, a calling device 160 of the conventional dial-operated type, an indicator pass key 150 of the non-locking type, an indicator restoring key 140, also of the non-locking type, a "go" signal lamp 164, and a "call back" signal lamp 165 which is arranged to be directly controlled by the "call back" key 365 provided at the receiving station. If it is desired permanently to record the items of information transmitted from the sending station to the receiving station, a pen recorder 177 may also be provided at the sending station. The checking indicator panel 100 includes five electro-mechanical indicators 101, 102, 103, 104 and 105 which are identical in construction and arrangement with those provided on the display board located at the receiving station. It is provided for the purpose of permitting the operator at the sending station to verify any given piece of information transmitted to the receiving station by observing the transmitted code number designating the item of information as this code number is set up in the checking panel.

As indicated above, the transmission of information from the sending station to the receiving station is effected by using definitely coded sets of impulses in digit form to control the indicators of a selected group as provided on the display board at the receiving station. The automatic switching equipment illustrated in Figs. 1 and 2 of the drawings is arranged to be controlled by the calling device 160 to select the different groups of indicators which are to receive the code numbers designating the different items of information, and to direct the coded digits of any particular code number to the appropriate indicators of the selected group. This equipment comprises a digit sequence and indicator selecting switch 250 of the well-known rotary type, and a group of control relays. More specifically considered, the rotary switch 250 comprises four sets of contacts of twenty-five points each, wipers 251, 251, 253 and 254 individually associated with the four contact sets, and an operating magnet 255 which, in combination with an associated ratchet and pawl mechanism, is arranged to drive the enumerated wipers over the contacts of their associated contact sets. In brief, the relay equipment includes a fast-acting pulsing relay R110, three slow-to-release digit relays R120, R130 and R145, a pulse repeating relay R210, a test relay R220, and a stepping relay R230. The enumerated relays are also arranged to control the indicators of the checking panel 100 during the transmission of the digits of each code number. In order to direct the different digits of a transmitted code number successively to the different indicators of the checking panel 100, a digit sequence switch 200 is provided. This switch is of the well-known minor type, comprising two sets of contacts of eleven points each, wipers 201 and 202 individual to the two contact sets, an operating magnet 204 for driving the two wipers over the contacts of their associated contact sets, and a release magnet 203 which, when energized, permits the spring-biased wipers 201 and 202 to be restored to normal. In order to effect the release of the indicators in the checking panel 100 after a code number is set up therein, in the manner explained below, two restoring relays R170 and R180 are provided. These two relays, like the release magnet 203 of the sequence switch 200, are arranged to be controlled by the indicator restoring key 140. For the purpose of restoring to normal the indicators provided in the checking panel 100 and on the display board located at the receiving station, a pulse generator 311 common to all of the indicators is provided. This generator, which is only schematically shown, may be of any desired commercial structure although preferably is of the motor-driven commutator type.

Current for energizing the indicator operating magnets, the control relays, the signal lamps, and the operating magnets of the rotary and minor switches, is supplied from a common direct current source, the positive terminal of which is connected to a common bus conductor and to ground. The negative terminal of the source is connected to a common negative bus conductor which terminates the various relay, magnet and lamp terminals identified in the drawings by the negative polarity sign. For convenience in describing the circuits involved, this source of current, which may conventionally comprise a storage battery floated across the terminals of a charging rectifier, has not been shown.

In considering the operation of the system, it may be assumed that the operator at the sending station receives an item of information which is to be transmitted to the receiving station at a time when all of the equipment provided in the system is at normal. It may be assumed further that the wipers of the digit sequence and indicator selecting switch 250 occupy the positions illustrated in the drawings. In such case, a circuit is completed through the wiper 254 and the contacts 224 and 135 for energizing the "go" signal lamp 164. The illumination of this lamp serves to advise the operator at the sending station that the automatic switching equipment is at normal and that one of the groups of indicators of the display board located at the receiving station has been selected to receive the digits of the code number designating the particular item of information to be transmitted. More specifically, with the wipers of the switch 250 engaging their respective associated first contacts, the illustrated indicators of the group 300 are preselected to receive the digits of the code number. For explanatory purposes, it may be assumed that the code number assigned to the particular received item of information is the number "45678."

In order to post the code number identifying the particular item of received information on the display board at the receiving station, the operator at the sending station repeatedly actuates the calling device 160 to dial the different digits of this number. When the dial of this device is first moved off normal, the off-normal springs 162 and 163 are closed to complete a circuit through the pulsing contacts 161 for energizing the two windings of the pulsing relay R110 in series. In operating, the relay R110 closes its contacts 113 to complete an obvious circuit for energizing the slow-to-release digit relay R120. At its contacts 112, the relay R110 opens a point in the operating circuit for the digit relay R130. At its contacts 111 and 114, the relay R110 prepares a circuit for energizing the pulse-repeating relay R210 in series with the operating magnet 306 of the indicator 301 in the selected indicator group 300. The digit relay R120, upon operating, closes its contacts 123 to prepare the operating circuit for the digit relay R130. At its contacts 121, the relay R120 opens a point in the circuit for energizing the operating magnet 204 of the digit sequence switch 200. At its contacts 122, the relay R120 opens a point in the circuit for energizing the operating magnet 255 of the rotary switch 250. At its contacts 124, the relay R120 further prepares the above-mentioned circuit for energizing the pulse repeating relay R210 in series with the operating magnet 306 of the indicator 301. At its contacts 125, the relay R120 opens a point in the operating circuit for the test relay R220. During the dial return movement of the calling device 160, the pulsing contacts 161 are opened and closed four times to transmit four impulses to the pulsing relay R110. This relay, in releasing at the beginning of the open-circuit period of the first impulse, opens its contacts 113 to interrupt the operating circuit for the digit relay R120, and closes its contacts 112 to complete the prepared operating circuit for the digit relay R130. At its contacts 111 and 114, the relay R110 opens the prepared circuit for energizing the pulse repeating relay R210 in series with the operating magnet 306 of the indicator 301. The digit relay R130, upon operating, closes its contacts 131 to prepare the circuit for energizing the operating magnet 294. At its contacts 132, the relay R130 similarly prepares a circuit for energizing the operating magnet 255. At its contacts 133, the relay R130 further prepares the circuit for energizing the pulse repeating relay R210 in series with the operating magnet 306 of the indicator 301. At its contacts 134, the relay R130 opens a point in the operating circuit for the test relay R220. At its contacts 135, the relay R130 opens the circuit for energizing the "go" signal lamp 164. When deenergized, this lamp indicates that the associated automatic switching equipment is busy. At its contacts 136, the relay R130 completes an obvious circuit for energizing the relay R145. In operating, the relay R145 opens its contacts 146 further to interrupt the operating circuit for the relay R220.

When the pulsing relay R110 reoperates at the end of the open-circuit period of the first impulse, it closes its contacts 113 to recomplete the operating circuit for the digit relay R120, and opens its contacts 112 to interrupt the operating circuit for the digit relay R130. At its contacts 111 and 114, the relay R110 completes the prepared circuit for energizing the pulse repeating relay R210 in series with the operating magnet 306 of the indicator 301. This circuit extends from ground by way of the contacts 111, the wiper 251 and its engaged first contact, the contact springs 307, the winding of the magnet 306, the wiper 252 and its engaged first contact, the winding of R210, the contacts 133, 124 and 114, and the resistor 126 to the negative terminal of the current source.

When thus energized the magnet 306 operates to rotate the associated display drum from its normal position to a position when the numeral "1" is displayed through the window of the indicator 301. Incident to the off-normal movement of this display drum, the contact springs 308 are moved into engagement to complete an alternative circuit for energizing the pulse repeating relay R210 and the magnet 306 in series with the operating winding of the off-normal relay R390. This circuit extends from ground by way of the operating winding of the relay R390, the contact springs 308, the winding of the magnet 306, the wiper 252 and its engaged first contact, the winding of R210, the contacts 133, 124 and 114, and the resistor 126 to the negative terminal of the current source. After this circuit is completed, the contact springs 307 are disengaged to open the initially completed circuit energizing the relay R210 and the magnet 306 in series. When energized in the above-traced circuit, the relay R390 locks up in a circuit which includes its holding winding and the contacts 391 and 381. At its contacts 393, the relay R390 disconnects the marking lead 394, which is individual to the indicator group 300, from ground. At its contacts 392, the relay R390 completes a path including the resistor 395 for impressing the negative potential of the current source upon the marking lead 394. The change in potential on the marking lead 394 serves to mark the indicator group 300 as busy in the contact set of the rotary switch 250 over which the test relay R220 is controlled in the manner explained below.

The pulse repeating relay R210, upon operating in response to the reoperation of the pulsing relay R110, closes its contacts 213 to transmit a ground pulse to the pen recorder 177, whereby the impulse as transmitted to the indicator 301 is recorded. At its contacts 211 and 212, the relay R210 completes a circuit for energizing the operating magnet 106 of the ten thousands indicator 101 provided in the checking panel 100. This circuit extends from ground by way of the contacts 211, the wiper 201 and its engaged first contact, the contact springs 107, the winding of the magnet 106, the wiper 202 and its engaged first contact, the contacts 212 and the resistor 214 to the negative terminal of the current source. When thus energized the magnet 106 actuates the associated display drum one step from the normal position thereof so that the numeral "1" is displayed through the window of the indicator 101. Incident to the off-normal movement of this drum, the contact springs 108 are closed to complete an alternative circuit for energizing the magnet 106, after which the contact springs 107 are opened to interrupt the initially completed circuit for energizing this magnet. The indicated alternative circuit is more direct and extends from ground by way of the contact springs 108, the winding of the magnet 106, the wiper 202 and its engaged first contact, the contacts 212, and the resistor 214 to the negative terminal of the current source.

When the pulsing relay R110 again releases during the open-circuit period of the second impulse, it opens the operating circuit for the digit relay R120, recloses the operating circuit for the digit relay R130 and, at its contacts 114, deenergizes the series-connected windings of the pulse repeating relay R210 and the magnet 306. In releasing, the relay R210 opens its contacts 213 to deenergize the operating magnet of the pen recorder 177 and, at its contacts 212, deenergizes the magnet 106 of the first indicator 101. The manner in which the second, third and fourth impulses are repeated by the pulsing relay R110 and the pulse repeating relay R210 to the operating magnets 306 and 106 of the indicators 301 and 101, and by the relay R210 to the pen recorder 177, will be readily apparent in view of the above explanation. At th end of the digit the display drums of the two indicators 101 and 301 are each operated to a position wherein the numeral "4" is displayed thereby. In this regard it will be noted that during the impulse repeating operation the operating circuits for the two digit relays R130 and R120 are alternately opened and closed at the contacts 112 and 113 by the pulsing relay R110. Due to the slow-to-release characteristics thereof, the two relays R120 and R130 remain operated during each digit dialed at the sending station.

Shortly following the end of the first digit, the relays R110 and R120 sequentially restore. In releasing, the relay R120 opens its contacts 124 to interrupt the circuit for energizing the pulse repeating relay R210 in series with the magnets of the indicators in the selected group, and closes its contacts 125 to prepare the operating circuit for the test relay R220. At its contacts 123, the relay R120 deenergizes the digit relay R130. At its contacts 121, the relay R120 completes a circuit through the contacts 131 for energizing the operating magnet 204 of the digit sequence switch 200. At its contacts 122, the relay R120 completes a circuit through the contacts 132 for energizing the operating magnet 255 of the digit sequence switch 250. When thus energized, the magnet 204 operates to advance the wipers 201 and 202 out of engagement with their associated first contacts and into engagement with their associated second contacts, whereby the circuit for transmitting current pulses to the magnet 106 of the first indicator 101 is broken and the circuit for energizing the operating magnet of the second indicator 102 is prepared. Shortly following the release of the relay R120, the digit relay R130 restores and opens its contacts 131 to deenergize the magnet 204. At its contacts 132, the relay R130 deenergizes the magnet 255. At its contacts 136, the relay R130 deenergizes the relay R145. At its contacts 134, the relay R130 further prepares the operating circuit for the test relay R220. At its contacts 135, the relay R130 prepares the circuit for energizing the "go" signal lamp 164.

The magnet 255, upon releasing, advances the wipers 251, 252, 253 and 254 out of engagement with their associated first contacts and into engagement with their associated second contacts, whereby the operating circuit for the magnet 306 of the first indicator 301 is opened and a circuit is prepared for transmitting current pulses to the operating magnet of the second indicator 302. Shortly after the wipers of the switch 250 are stepped to engage their associated second contacts, the relay R145 releases and closes its contacts 146 further to prepare the operating circuit for the test relay R220.

The manner in which the five impulses of the second digit are repeated to the operating magnets of the two indicators 102 and 302 and to the pen recorder 177, will be clearly apparent from the above explanation. It will be understood from this explanation that the three relays R120, R130 and R145 are reoperated at the beginning of the second digit and remain operated until the digit is ended. It will also be understood that at the end of the digit the indicating drums of the two indicators 102 and 302 are operated to off-normal positions wherein the numeral "5" is displayed thereby. At the end of the digit, the relays R110, R120, R130 and R145 are sequentially released in that order, whereby the wipers of the two sequence switches 200 and 250 are stepped a second step. Incident to this stepping operation, the pulsing circuit controlled by the pulse repeating relay R210 is transferred to include the operating magnet of the indicator 103, and the pulsing circuit controlled by the pulsing relay R110 is rearranged to include the operating magnet of the third indicator 303 in the indicator group 300. The impulses of the third, fourth and fifth digits are repeated in like manner to the indicators 103, 104 and 105 of the checking panel 100 and to the indicators 303, 304 and 305 of the indicator group 300 in a manner which will be clearly apparent from the preceding explanation. In this regard it will be understood that at the end of the dialing operation the code number "45678" is posted in the checking indicator panel 100 and in the indicator group 300. This number as interpreted by the attendant at the receiving station indicates the specific item of information received by the operator at the sending station. The code number as posted in the checking panel 100 permits the operator at the sending station to verify the code number as it is transmitted to the receiving station. In this regard it is pointed out that if the attendant at the receiving station is in doubt as to the authenticity of the received information, she may ask the operator at the sending station to repeat the transmission of the code number. To this end, the "call back" key 365 is operated to complete an obvious circuit for energizing the "call back" signal lamp 165. When this lamp is energized at the sending station, the operator is informed that verification of the transmitted code number is requested.

Incident to the transmission of the last digit of the code number, the digit sequence and indicator selecting switch 250 is automatically operated to select another group of indicators at the receiving station in which no code number is posted. In this regard it will be recalled from the preceding explanation that when the display drum of the first indicator 301 in the indicator group 300 is operated to an off-normal position, the off-normal relay R390 associated with this indicator group is locked energized. With this relay operated, the negative terminal of the current source is connected to the marking lead 394 to indicate that the indicator group 300 has a code number posted therein. On the other hand, when no code number is posted in the indicator group 300, the off-normal relay R390 is deenergized such that the marking lead 394 is connected to ground through the contacts 393. In a similar manner, the four other marking leads 260, 261, 262 and 263, individual to the four other indicator groups, may be marked with ground potential or the negative potential of the current source, depending upon the idle or busy condition thereof. At this point it may be assumed that the second indicator group, i. e., that individually associated with the marking lead 260, is busy or has a code number posted therein, such that the lead is connected to the negative terminal of the current source.

Shortly following the transmission of the last digit of the code number in the manner explained above, the wipers of the switch 250 are operated to engage their respective associated sixth contacts, and the four relays R110, R120, R130 and R145 are sequentially released. With the wiper 253 in this position, the operating circuit for the test relay R220 is further prepared. This circuit is completed at the contacts 146 in response to the release of the relay R145, and may be traced as extending from ground by way of the contacts 125, 134 and 146, the winding of R220, the wiper 253 and its engaged sixth contact, and the marking lead 260 to the negative terminal of the current source. It will be noted that if the wiper 253 finds the marking lead 260 connected to ground, indicating that the associated indicator group is idle, the winding of the test relay R220 is short-circuited over the circuit just traced and does not operate. If energized in this circuit, the relay R220 locks up in a circuit which includes the contacts 221 and 223, and the resistor 226. At its contacts 222, the relay R220 completes an obvious circuit for energizing the stepping relay R230. At its contacts 224, the relay R220 opens another point in the circuit for energizing the "go" signal lamp 164. The slow-to-operate relay R230, upon operating, closes its contacts 231 to complete an obvious circuit for energizing the magnet 255. This magnet, in operating, opens its contacts 256 to deenergize the stepping relay R230. In restoring, the relay R230 opens its contacts 231 to deenergize the magnet 255. When the magnet 255 is deenergized the wipers of the switch 250 are stepped out of engagement with their associated sixth contacts and into engagement with their associated seventh contacts. Thus the above-traced operating circuit for the test relay R220 is broken at the wiper 253. The magnet 255, in releasing, also closes its contacts 256 to again energize the stepping relay R230. This relay, in reoperating, closes its contacts 231 to again energize the magnet 255. The interrelated operation of the stepping relay R230 and the magnet 255 continues until the wipers of the switch 250 are advanced to engage their associated eleventh contacts, wherein the marking lead 261, corresponding to the third group of indicators, is connected to the wiper 253 to complete a test circuit which includes the winding of the test relay R220. If this marking lead is also connected to the negative terminal of the current source, the winding of the test relay R220 is not deenergized and the stepping operation of the switch 250 continues. On the other hand, if the third group of indicators is at normal, such that the marking lead 261 is connected to ground, the winding of the test relay R220 is short-circuited. When thus deenergized, the relay R220 releases and open its contacts 222 to interrupt the operating circuit for the stepping relay R230 and thus prevent the latter relay from reoperating to again energize the magnet 255. At its contacts 221 and 223, the relay R220 opens two points in its own locking circuit. At its contacts 224, the relay R220 recompletes the circuit for energizing the "go" signal lamp 164, this circuit now extending from ground by way of the wiper 254 and its associated eleventh contact, the contacts 224 and 135, and the filament of the lamp 164 to the negative terminal of the current source. Following the release of the test relay R220, the third group of indicators is selected through the wipers of the switch 250 for use in posting the digits of the code number next dialed by the operator at the sending station.

From the above explanation it will be understood that shortly following the transmission of a code number to a selected group of indicators at the receiving station, operation of the switch 250 is initiated to search for another group of indicators in which no code number is posted. It will also be apparent that the searching operation continues until an indicator group in which no code number is posted is found. Under certain circumstances this may entail the operation of the switch 250 to test several groups of indicators before an idle group is found. During the searching period the "go" signal lamp 164 is deenergized, thus indicating to the operator at the sending station that a dialing operation cannot be started. Immediately an idle group of indicators is located, however, this signal lamp is energized to inform the operator at the sending station that a dialing operation may be started.

If for any reason the operator at the sending station desires to pass the last portion of the indicators of a selected indicator group after the first indicators of the group have been set to display a code number, the indicator pass key 150 is momentarily actuated to its off-normal position. When this key is operated to its off-normal position the contact springs 151 are closed to complete a circuit, including the resistor 152 and the contacts 125, 134 and 146, for energizing the test relay R220. The test relay, upon operating, locks up in a circuit including the contacts 221 and 223 and closes its contacts 222 to initiate the interrelated operation of the stepping relay R230 and the operating magnet 255 in the manner explained above. As these two circuit elements interact, the wipers of the switch 250 are advanced step by step through the positions corresponding to the unoperated indicators of the selected group and into the position corresponding to the first indicator of the next indicator group. If this next indicator group is busy the searching operation of the switch 250 continues. It is only terminated when the wipers are advanced to the position corresponding to the first indicator of the first available indicator group in which no code number is posted.

As indicated by the preceding explanation, the checking indicator panel 100 is provided for the purpose of enabling the operator at the sending station to verify each code number transmitted to the receiving station. It will be understood, therefore, that the indicators of this panel are to be restored to normal at the end of each dialing operation. To this end, the restoring key 140 is momentarily actuated to its off-normal position immediately after a dialing operation is completed and the posted code number is checked. Incident to this operation, the contact springs 143 are closed to complete an obvious circuit for energizing the release magnet 203. This magnet, in operating, attracts its associated holding pawl, permitting the spring-biased wipers 201 and 202 to be returned to normal. At the contact springs 141, an obvious circuit is completed for energizing the restoring relay R170. This relay, in operating, closes its contacts 171 to prepare a locking circuit for itself. At its contacts 172 to 176, inclusive, the relay R170 prepares a circuit for transmitting restoring pulses to the operating magnets of each of the five indicators in the checking panel 100. At the contact springs 142 of the key 140, a circuit is prepared or completed for energizing the winding of the restoring relay R180 in series with the operating magnets of the six indicators in the checking panel 100. This circuit, when completed by the pulse generator 311, extends from the negative terminal of the current source by way of the commutating contacts of the pulse generator 311, the winding of R180, the contact springs 142, the contacts 172 to 176, inclusive, and the parallel-connected windings of the six indicator operating magnets to ground. When energized in this circuit, the relay R180 closes its contacts 181 to complete the prepared locking circuit for the restoring relay R170. At its contacts 182, the relay R180 closes an obvious shunt path across the contact springs 142, thereby to prevent the restoring pulse circuit from being interrupted in response to the release of the key 140. With the two relays R170 and R180 operated, restoring pulses are transmitted from the pulse generator 311 to the operating magnets of the five indicators 101, 102, 103, 104 and 105 until all of the display drums of these indicators have been driven to their respective normal positions. These pulses are obviously transmitted through the winding of the relay R180, which relay being of the slow-to-release type remains operated until the pulsing circuit is broken. In this regard it is pointed out that when the indicating drum of each indicator is returned to its normal or blank position, the associated cam is operated to break the restoring pulse circuit through the winding of the associated magnet. Thus when the display drum of the indicator 101 is moved to its normal or blank position, the contact springs 108 are disengaged to interrupt the restoring pulse circuit through the associated magnet 106. Also, the contact springs 107 are moved into engagement to re-prepare the circuit, controlled by the pulse repeating relay R210, for energizing the magnet 106. It will be understood, therefore, that after the display drums of the five indicators 101, 102, 103, 104 and 105 have been restored to their normal or blank positions, no further current pulses are transmitted through the winding of the relay R180. Accordingly, this relay restores. In releasing, the relay R180 opens its contacts 181 to deenergize the restoring relay R170. The latter relay, upon restoring, opens its contacts 171 further to interrupt its locking circuit, and at its contacts 172 to 176, inclusive, further interrupts the branch circuits for transmitting restoring pulses to the operating magnets of the five indicators in the checking panel 100. Following the operations just described, all of the indicators in the checking panel occupy their respective normal or blank positions and may be utilized to register the digits of another code number.

The attendant at the receiving station, in order to restore to normal any particular group of indicators, actuates the associated indicator restoring key. Thus in order to clear the indicator group 300 of the code number set up therein in the manner explained above, the restoring key 340 is momentarily actuated to its off-normal position, wherein the contact springs 341 and 342 are respectively operated into engagement. At the contact springs 341, an obvious circuit is completed for energizing the connect relay R370. At the contact springs 342, a circuit is prepared for transmitting current pulses through the winding of the restoring relay R380 and the parallel-connected windings of the operating magnets of the indicators in the indicator group 300. The relay R370, upon operating, closes its contacts 371 to prepare a locking circuit for itself. At its contacts 372 to 376, inclusive, the relay R370 completes the circuit for transmitting restoring pulses to the operating magnets of the indicators in the indicator group 300. These current pulses are transmitted over a circuit which extends from the negative terminal of the current source by way of the commutating contacts of the pulse generator 311, the winding of R380, the contact springs 342, the contacts 372 to 376, inclusive, the parallel-connected magnet windings of the indicators in the group 300, and the operating winding of the relay R390 to ground. When energized by the first current pulse transmitted over this circuit, the relay R380 closes its contacts 383 to complete an obvious path in shunt with the contact springs 342 and thus prevent the restoring pulse circuit from being opened until all of the indicators of the group 300 have been restored to normal. At its contacts 381, the relay R380 opens the locking circuit for the off-normal relay R390. At its contacts 382, the relay R380 completes the prepared locking circuit for the connect relay R370. Each time a restoring pulse is transmitted to the operating magnet of any one of the five indicators in the indicator group 300, the magnet operates to advance the associated display drum one step. Accordingly, after a given number of pulses have been transmitted to the magnets of the indicators in this group, the display drums of these indicators are restored to normal. In this regard it is again pointed out that when the display drum of any indicator is moved to its normal or blank position, the associated commutator controlled contact springs are operated to interrupt the restoring pulse circuit. For example, when the display drum of the indicator 301 is returned to normal the contact springs 308 are disengaged to prevent further energization of the magnet 306. Also, the contact springs 307 are moved into engagement to prepare a pulsing circuit over which impulses may be transmitted to this magnet under the control of the pulsing relay R110. After all of the indicators in the group 300 are restored to normal, no further circuit is available for energizing the operating winding of the off-normal relay R390 or the winding of the restoring relay R380. Accordingly, these two relays release in the order named. The relay R380, upon restoring, opens its contacts 382 to deenergize the connect relay R370. Following the restoration of the latter relay the indicator control circuit 310 individual to the indicator group 300 is fully restored to normal.

While one embodiment of the invention has been disclosed, it will be understood that various modifications may be made therein which are within the true spirit and scope of the invention.

What is claimed is:

1. An indicating system comprising a plurality of groups of individual multi-positioned character indicating means, means whereby each indicating means is moved to its different positions indicating its characters by a series of successive impulses, the number of which corresponds to the character to be indicated, impulsing means for transmitting series of impulses, the number in each series being indicative of the character represented by said series, a multi-position sequence switch having a position for each indicating means through which the impulses for operating it are routed, means for advancing the sequence switch from position to position, means operated at the termination of each series of impulses for operating the advancing means to advance the sequence switch to the next position, and means operated when the sequence switch encounters a group of indicators in which an indication is set up for operating the advancing means to move the sequence switch from position to position for said group until it moves to a position corresponding to the first indicating means of the next group.

2. An indicating system comprising a plurality of groups of individual multi-position character indicating means, means whereby each indicating means is moved to its different positions indicating its characters by a series of successive impulses, the number of which corresponds to the character to be indicated, impulsing means for transmitting series of impulses, the number in each series being indicative of the character represented by said series, a multi-position sequence switch having a position for each indicating means through which the impulses for operating it are routed, means for advancing the sequence switch from position to position, means operated at the termination of each series of impulses for operating the advancing means to advance the sequence switch to the next position and means operated when the sequence switch encounters a group of indicators in which an indication is set up for operating the advancing means to move the sequence switch from position to position for said group until it moves to a position corresponding to the first indicating means of the next group, said last means including a test device controlled by said switch and operative to determine whether or not an indication is posted in a group of indicators when said switch is operated to the setting corresponding to the first indicator of the group.

3. An indicating system comprising a plurality of groups of individual multi-position character indicating means, means whereby each indicating means is moved to its different positions indicating its characters by a series of successive impulses, the number of which corresponds to the character to be indicated, impulsing means for transmitting series of impulses, the number in each series being indicative of the character represented by said series, a multi-position sequence switch having a position for each indicating means through which the impulses for operating it are routed, means for advancing the sequence switch from position to position, means operated at the termination of each series of impulses for operating the advancing means to advance the sequence switch to the next position and means operated when the sequence switch encounters a group of indicators in which an indication is set up for operating the advancing means to move the sequence switch from position to position for said group until it moves to a position corresponding to the first indicating means of the next group, said last means including a test device controlled by said switch and operative to determine whether or not an indication is posted in a group of indicators when said switch is operated to the setting corresponding to the first indicator of the group and means controlled by said test device for automatically advancing said switch through the settings corresponding to the indicators of a group in which an indication is posted.

WM. WALTER OWEN,
*Executor of the Estate of Bernard D. Willis, Deceased.*